United States Patent [19]

Licari

[11] Patent Number: 5,505,850
[45] Date of Patent: Apr. 9, 1996

[54] COLANDER AND STABILIZER

[76] Inventor: Yaffa Licari, 875 Ocean Ave., Elberon, N.J. 07740

[21] Appl. No.: 316,099

[22] Filed: Sep. 30, 1994

[51] Int. Cl.⁶ .............................................. B01D 29/085
[52] U.S. Cl. ......................... 210/464; 210/474; D7/667
[58] Field of Search ........................... D7/667; 210/464, 210/465, 469, 470, 473, 474, 477, 482, 497.01

[56] References Cited

U.S. PATENT DOCUMENTS

| D. 254,529 | 3/1980 | Arnoff | D7/667 |
| D. 327,608 | 7/1992 | Daenen et al. | D7/667 |
| D. 334,691 | 4/1993 | Feer | D7/667 |
| D. 339,506 | 9/1993 | Feer | D7/667 |
| D. 339,720 | 12/1993 | Kolada | D7/667 |
| 462,076 | 10/1891 | Devoll | D7/667 |
| 831,566 | 9/1906 | Norris | D7/668 |
| 3,091,339 | 5/1963 | Marra et al. | D7/667 |
| 4,452,581 | 6/1984 | Panehal | D7/667 |
| 5,279,007 | 1/1994 | Kolada | 210/474 |

*Primary Examiner*—Robert A. Dawson
*Assistant Examiner*—W. L. Walker
*Attorney, Agent, or Firm*—Morton Chirnomas

[57] ABSTRACT

An apparatus for straining and rinsing constructed in accordance with the present invention comprises a bowl portion having an upper rim. The bowl portion has a plurality of perforations through the wall thereof. The bowl portion further has attached at a first position on the upper rim engaging means for hookingly engaging a portion of a kitchen sink, thereby permitting a user to strain edibles without physically holding the apparatus and without the apparatus occupying the bottom of the sink.

10 Claims, 7 Drawing Sheets

COLANDER AND STABILIZER

FIELD OF THE INVENTION

The present invention relates to kitchen utensils generally intended for rinsing and preparing foods such as berries, noodles, pastas and macaroni, vegetables and the like. More particularly, the present invention relates to kitchen accessories known as strainers and/or colanders which are generally used for rinsing fruits and vegetables and straining cooked foods such as noodles, pasta and macaroni.

BACKGROUND OF THE INVENTION

For thousands of years, since before the age of the Roman Empire, man has used various implements for the separation of solid substances from fluids in which they may be suspended, or to separate solids of one size from solids having a different size. Such separation implements which separate mixtures of materials having differences in physical size or being in different physical states, i.e., solid versus liquid phase, are known by various terms including, but not necessarily limited to, sieves, strainers, colanders and the like. For purposes of ease of discussion, the general class of separating devices will be referred to herein as straining devices.

Generally speaking, the structure of most straining devices comprises a container or bowl portion into which the mixture or slurry of materials to be strained or separated is poured and at least briefly contained. Usually, the bottom, and sometimes the sides, of the container portion has a plurality of openings. The openings are sized to permit either the passage of that material which one desires to collect or to retain that material which one seeks to keep.

Optional components of a strainer which would be used in food preparation are a handle by which the user holds the strainer and legs on which the strainer may be rested while the materials to be strained are poured from a primary holding container into the strainer itself. Known handles include a straight member extending horizontally from an upper edge or rim of the strainer or its container portion. Another known version of a strainer is shaped much like a coffee mug having on or more handles, each of which is D-shaped and projects horizontally in an outward direction (rather than vertically and in a downward direction) from the upper edge or rim of the strainer or its container portion.

The addition of one or more handles or legs to the basic structure developed out of the need to be able to strain hot mixtures. The handles allow a user to hold the strainer with his hands at a safe distance from the container portion while pouring in the hot mixture. However, a strainer having a single handle suffers from the disadvantage that a single, lone user has only one hand available for lifting the container holding the hot mixture since the other hand must control the strainer itself. Additionally, the wrist of the hand holding the strainer is subjected to a great strain due to the torque when the mixture is initially placed in the strainer.

The addition of legs to a strainer allows the user to place the strainer on an even surface, thus freeing both hands for lifting the container having the hot mixture. However, this structure suffers from the disadvantage that it requires the user to place the strainer onto a surface which will drain away the liquid (where straining edibles and comestibles). Most commonly, the only suitable surface for draining away water from a strainer placed thereon in most households is the kitchen sink. However, when a cook is preparing a meal, the kitchen sink can become the most valuable of all the real estate in a kitchen and it can actually be a hardship to devote all or nearly all of the sink to a strainer. Additionally, it may occur that the bottom of the kitchen sink is already occupied by other items such as dirty dishes, vegetable peels, etc. These must be removed prior to resting a strainer on the sink bottom, thereby requiring additional time and energy when these are in short supply and it may be most inconvenient. Failure to remove such objects leads to the possibility that the strainer will tip over, spilling its contents. Moreover, the contents of the strainer will come into contact with unhygienic or unsavory materials, such as food scrapings, dirty soap water, and the like and may become contaminated thereby.

It should particularly be noted that the basic design of the strainer has not substantially changed from a structural standpoint in thousands of years and that the known strainers and colanders of today's manufacture still suffer from the above disadvantages as did their ancestors many centuries ago. Although advanced modern materials have been developed for manufacturing the modern strainer and colander, i.e., most notably the plastics polyethylene, polypropylene and copolymers, the structure has remained relatively unchanged.

SUMMARY AND OBJECTS OF THE INVENTION

Therefore it is one object of the present invention to provide an apparatus for straining which reduces the risk to the user of scalding their hands, thereby allowing the safe straining of hot mixtures.

It is another object of the present invention to provide an aparatus for straining which reduces the strain placed on the user's wrists.

It is still another object of the present invention to provide an apparatus for straining which frees the user's hand's for doing other tasks while the straining process continues.

It is yet another object of the present invention to provide an aparatus for straining which allows the straining process to continue without monopolizing the valuable space at the bottom of the kitchen sink, thereby making that space available for other duties.

It is yet a further object of the present invention to provide an apparatus for straining which will reduce the risk of exposing the contents of the strainer to unhygienic or unsavory materials which may be at the bottom of the sink, such as food scrapings, dirty soap water and the like.

It is still a further object of the present invention to provide an aparatus for straining which will reduce the risk of tipping over the strainer and spilling its contents.

The foregoing objectives and others not specifically enumerated herein are accomplished by the present invention which relates generally to an apparatus for straining mixtures of solid and/or semisolid edible and comestibles in the environment of a kitchen. However, it should be understood that the embodiments described herein are merely exemplary and that a person skilled in the art may make many variations and modifications without departing from the spirit and scope of the invention. All such modifications and variations are intended to be included within the scope of the invention as described herein.

The present invention relates more particularly to a colander for rinsing and straining edibles and comestibles of a solid or semi-solid form, comprising a bowl portion having an upper rim. The bowl portion includes a plurality of perforations through the wall thereof through which water or another liquid will pass, but sized so that the desired solid or semi-solid is retained therein. The bowl portion is surrounded at its upper most point by a flange-like upper rim. The bowl portion is further provided with either nozzle engaging means for hookingly engaging around a sink faucet or rim engaging means for hookingly engaging over the sink rim. The colander may further have a handle attached at a second position on the upper rim for increased ease of handling the colander when it is filled. Alternatively, the colander may have a gripping means integrally formed into the upper rim.

The nozzle engaging means for hookingly engaging around a sink faucet generally comprises a hook member which is preferably an integrally formed lateral extension of the upper rim and extends outwardly therefrom. The hook member is provided with a length and thickness such that it can be used to hook around the faucet of most sinks and when let go acts to suspend the colander from the sink faucet such that the upper rim is in a nearly horizontal orientation.

In an alternative embodiment, the hook member comprises an upper rim extension at the end of which there is pivotally joined thereto an adjustable hooking arm. A user with a sink having a nonstandard distance from the back of the faucet to the back wall of the sink can thus still practice the invention with this variation.

In the embodiment where the colander has sink rim engaging means, which is useful with a double basin sink or for use in a sink which does not have a centralized faucet, the engaging means comprises an L-shaped hook member the short arm of which projects laterally and outwardly from the upper rim a distance of from about one inch to about five inches, and preferably from one and a half inches to about three inches. The long arm of the L-shaped hook member then extends downward a distance forming an angle with the underside of the short arm of from sixty degrees to one hundred ten degrees, and preferably in the range of from sixty five degrees to ninety degrees. The length of the long arm of the L-shaped hook member is largely related to the capacity of the colander, and can range from as little as two inches to as much as six inches for household usage and substantially larger even than that for a colander designed for commercial use.

Another modification of the embodiment having the sink rim engaging means includes providing the bowl portion of the colander with at least one portion of the upper rim and a portion of the bowl wall adjacent thereto with a substantially planar outer surface to provide a contact area with the wall of the sink. The height of the flattened portion of rim and wall is similar to the length of the long arm of the L-shaped hook member, although the length may vary substantially depending mostly on the capacity and dimensions of the bowl portion.

BRIEF DESCRIPTION OF THE DRAWINGS

For a more complete understanding of the present invention, reference may be had to the following detailed description of exemplary embodiments taken in conjunction with the accompanying figures of the drawings, in which.

DETAILED DESCRIPTION OF THE EXAMPLARY EMBODIMENTS

Figure 1:
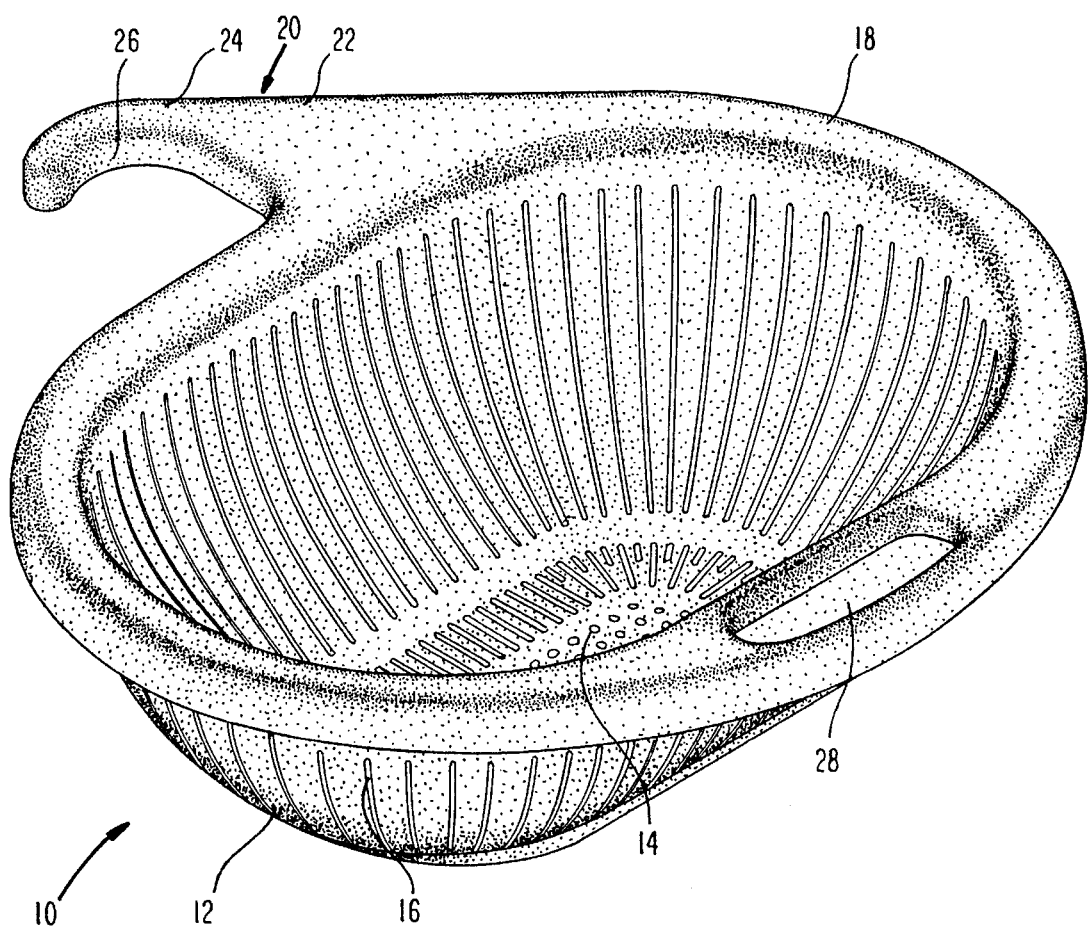
FIG. 1 shows a perspective view taken from the front left side of one exemplary embodiment of an apparatus for straining constructed in accordance with the principles of the present invention.
Figure 2:
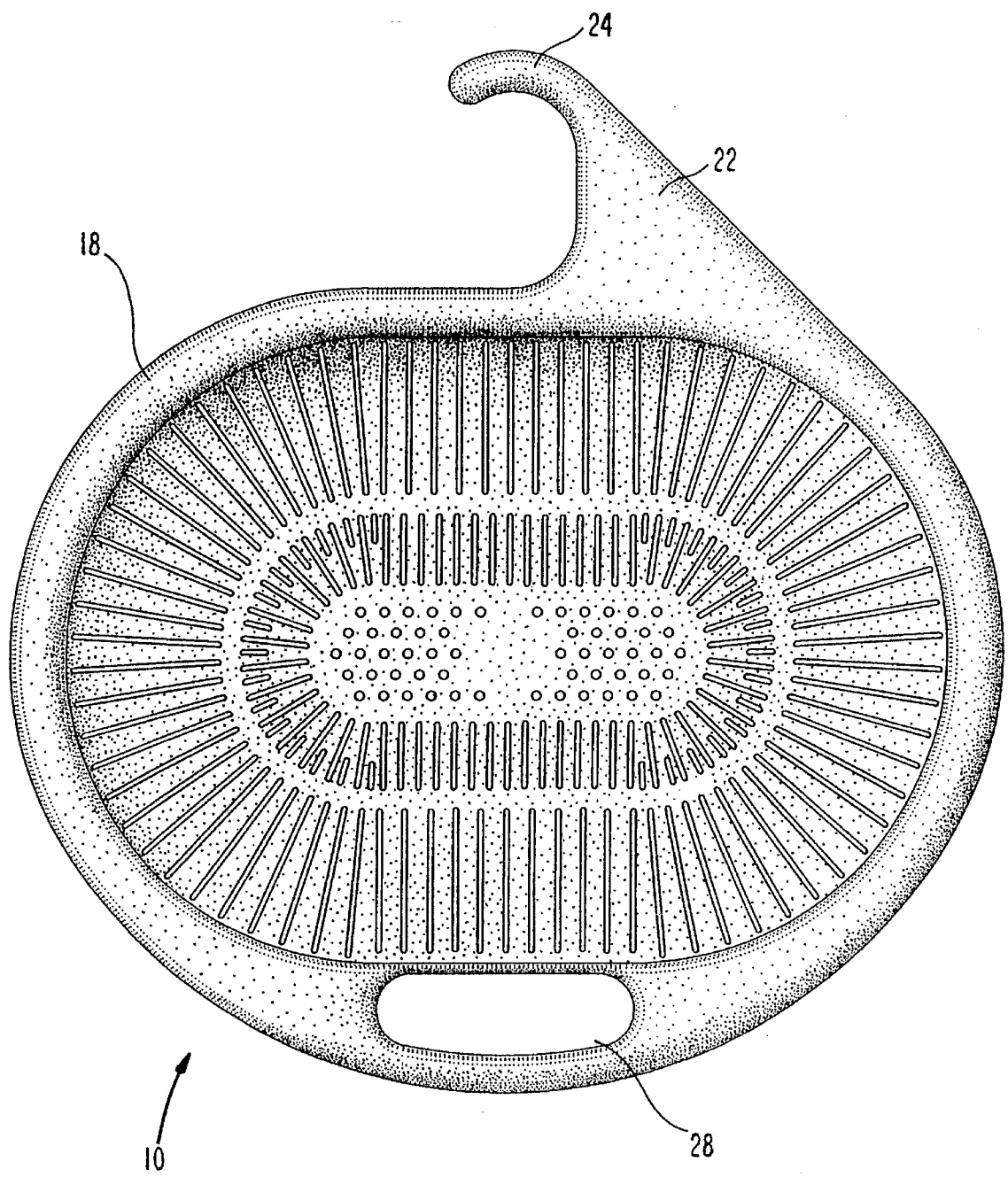
FIG. 2 shows a top plan view of the exemplary embodiment of an apparatus for straining as shown in FIG. 1.
Figure 3:
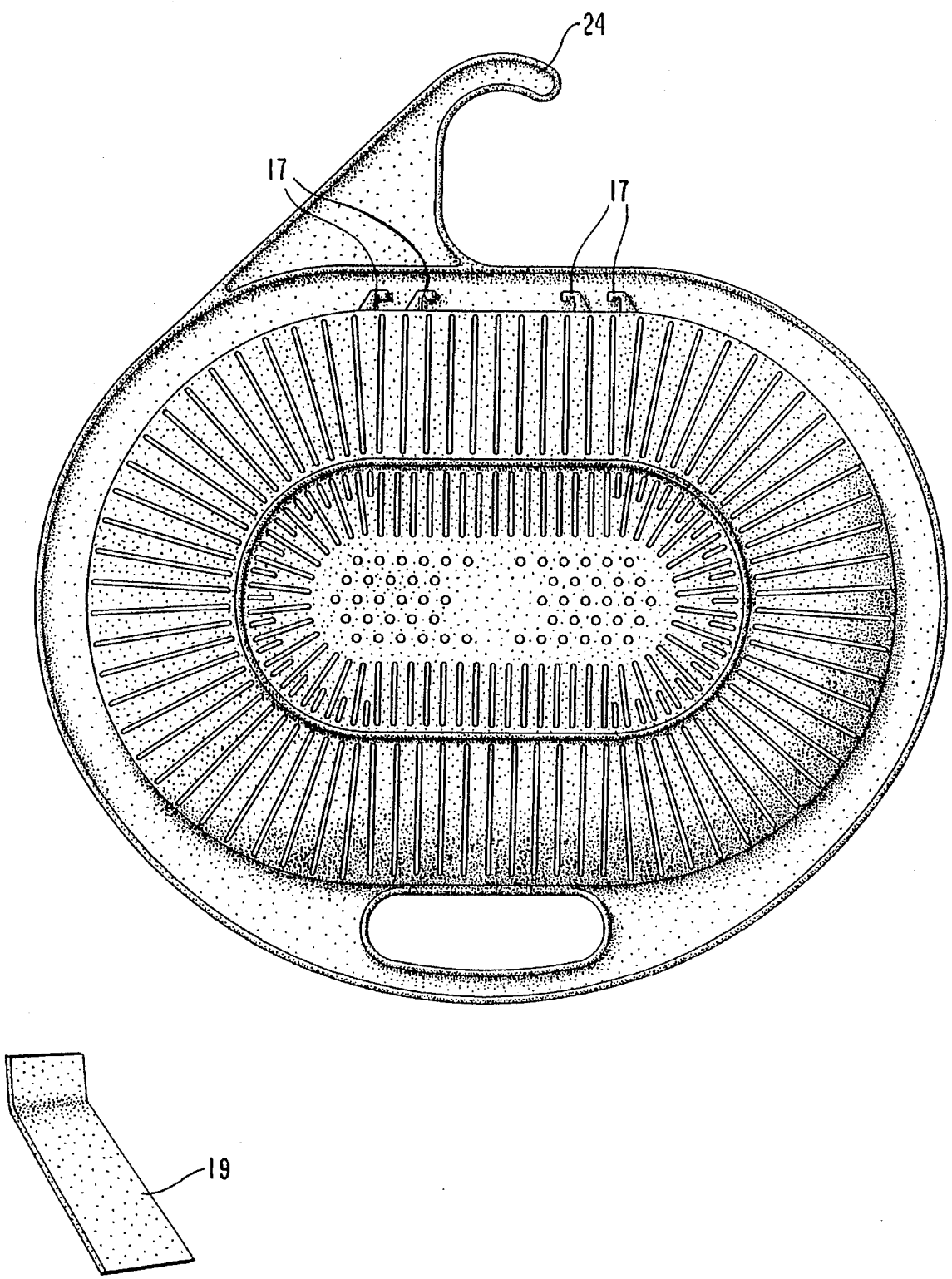
FIG. 3 shows a bottom plan view of the exemplary embodiment of an apparatus for straining as shown in FIG. 1.
Figure 4:
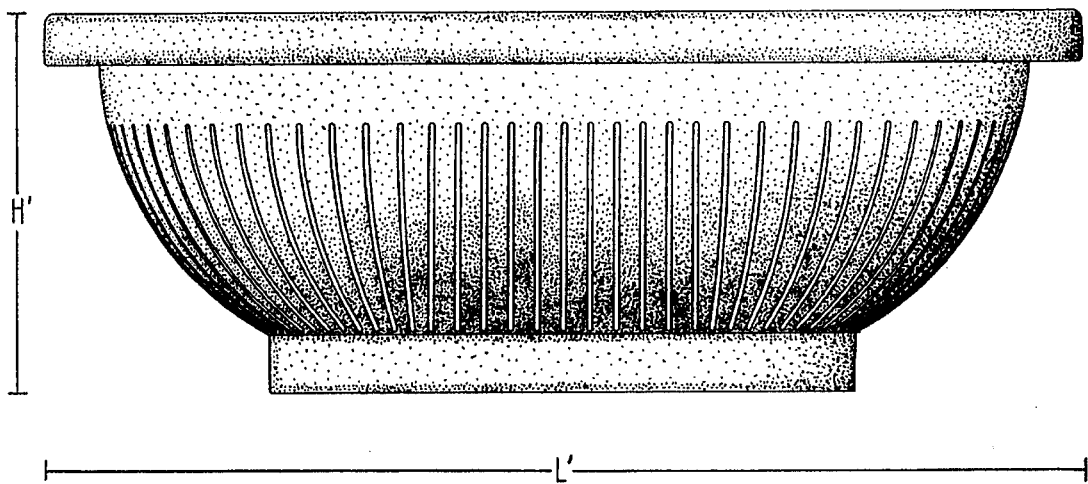
FIG. 4 shows a front elevational view of the exemplary embodiment of an apparatus for straining as shown in FIG. 1.
Figure 5:
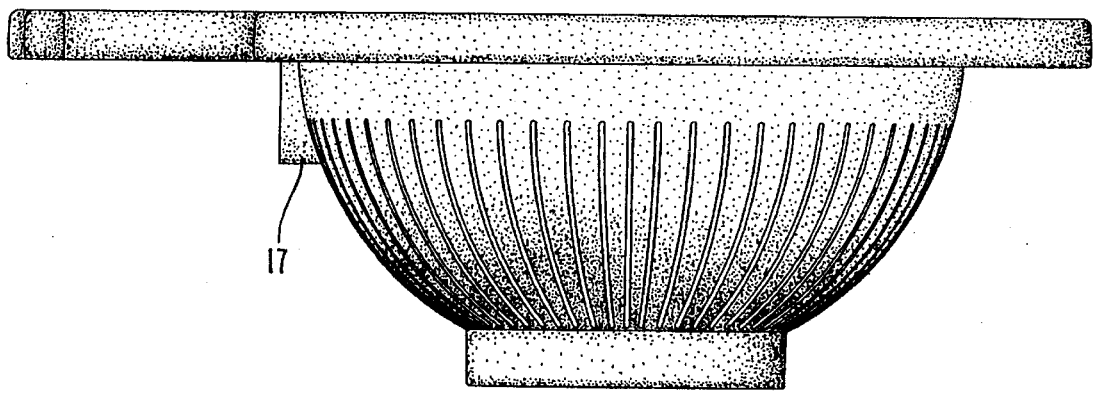
FIG. 5 shows a left side elevational view of the exemplary embodiment of an apparatus for straining as shown in FIG. 1.

With reference to FIGS. 1–5, colander 10 is shown having an approximately ovate bowl portion 12 which is perforated by a plurality of holes 14 and slots 16 which are sized in this case to allow retention of most styles of pasta, macaroni, fruit, vegetables, rice, etc. Bowl portion 12 is sized along its width W' and length L' so that a central faucet having a radius of motion of approximately eight inches will, with a simple back and forth motion of the faucet, rinse all the contents of colander 10 when properly positioned.

Bowl portion 12 is provided along its top edge with a flange-like rim 18 which extends laterally outward therefrom. Offset somewhat from a position P' which is at the center rear portion of rim 18, there is attached to rim 18 nozzle engaging means 20. Nozzle engaging means 20 comprises a laterally and outwardly extending stabilizer 22 which has a roughly triangular conformation and hook member 24 attached at the end of stabilizer 22 distal from rim Hook member 24 has a faucet contact surface 26 on the inside thereof and opposite rim 18. Contact surface 26 describes an arc of about sixty degrees or so, as long as that is sufficiently curved for gripping the back surface of a centrally positioned sink faucet. On the opposite side of bowl portion 12 from nozzle engaging means 20, in rim there is formed a grip 28 by which a user can hold colander 10 when manipulation is required.

The colander 10 of the present invention further includes bowl orientation means for maintaining bowl portion 12 in a relatively horizontal orientation even when loaded. Located on the outer surface of bowl portion 12, the bowl orientation means are directly below and positioned equidistantly on either side of position P'. Located there are matching L-channel slots 17 which are positioned and sized to receive an insert 19. Insert 19 comprises a slim plastic card, sized at least at one end to be received snugly into slots 17 and preferably having an angle formed therein such that when it is inserted in place it extends downwards and somewhat outwards at a slight angle of from one degree to as much as sixty degrees from vertical. Thus when hook member 24 of colander 10 is installed around the faucet of a sink, insert 19 contacts the surface of the sink wall preventing the front of colander 10 from tilting downwards under the weight of the mixture (e.g. wet noodles) placed therein for straining. Together, slots 17 and insert 19 comprise the bowl orientation means.

FIGS. 6–9 show alternate embodiments of the present invention. For purposes of clarity of discussion, where parts are referred to which have corresponding parts in FIGS. 1–5 or have already been described with respect to FIGS. 1–5, the same reference number is used but increased by 100 or 200.

Figure 6:
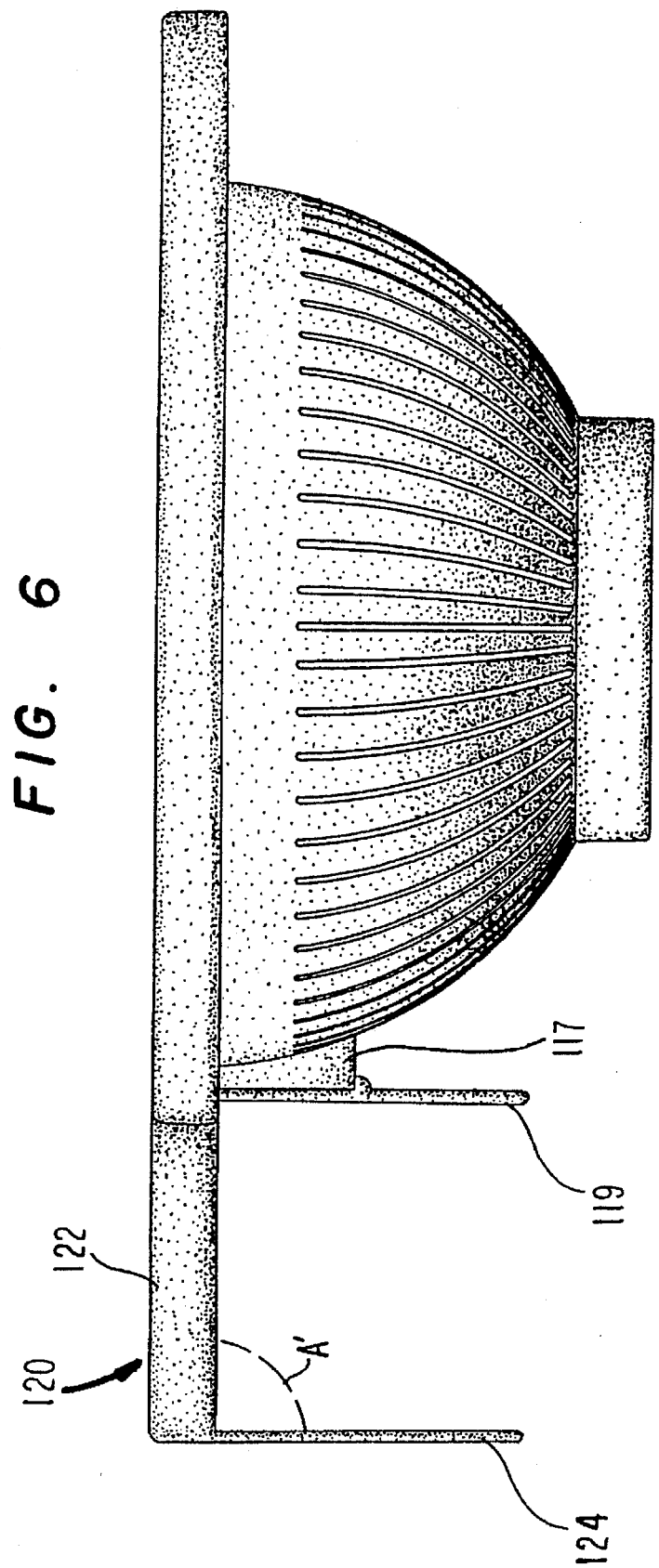
FIG. 6 shows a side elevational view of another exemplary embodiment of an apparatus for straining constructed in accordance with the principles of the present invention.
Figure 7:
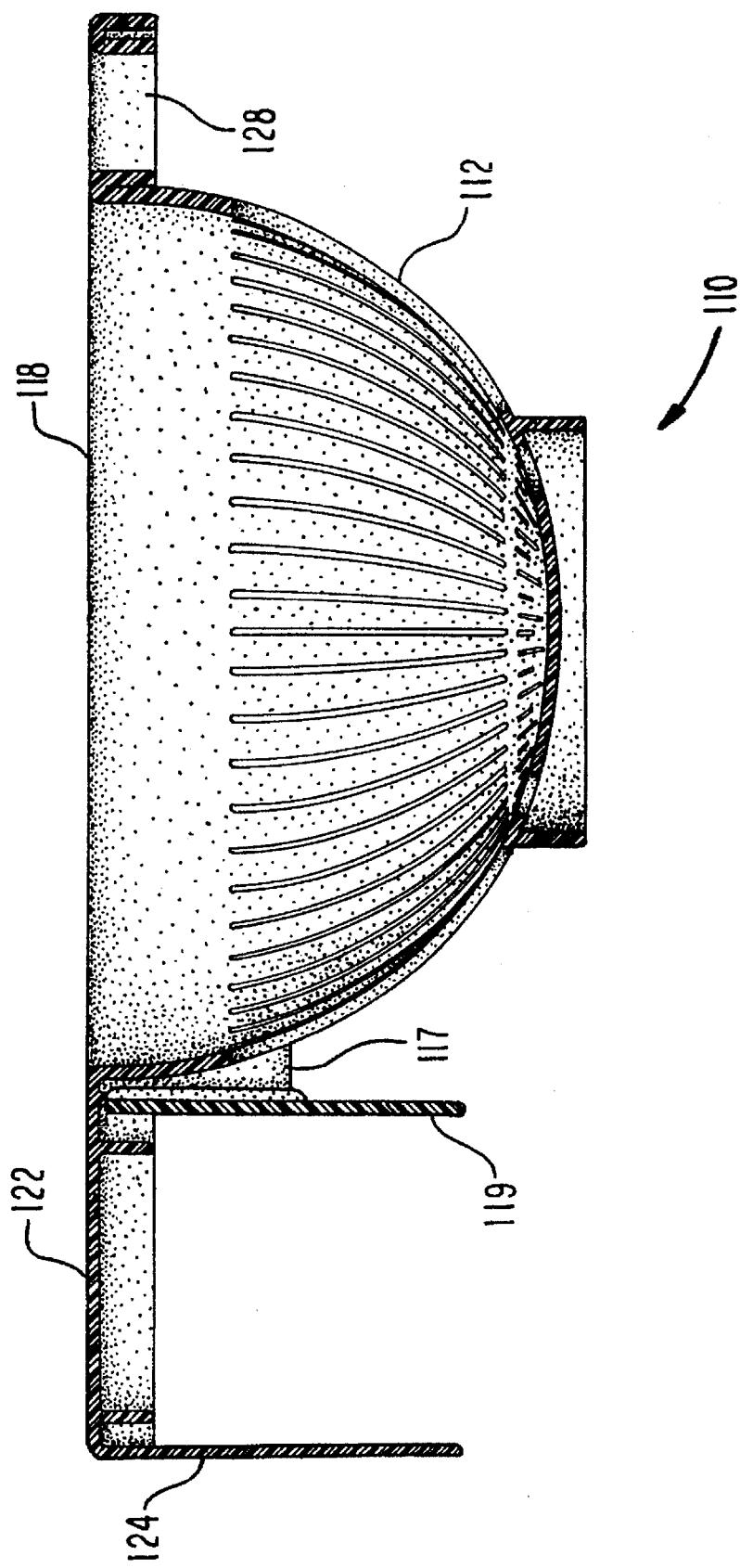
FIG. 7 shows a partial cross-section of the exemplary embodiment of an apparatus for straining as shown in FIG. 6.

With reference now to FIGS. 6–7, there is shown an alternate embodiment of a colander 110 having a bowl portion 112 which is perforated by a plurality of holes 114 and slots 116. The depicted colander 110 is intended to be used hanging on the dividing wall between the basins of a double sink or from the outer wall of a sink which does not have a central faucet around which nozzle engaging means 20 of the previous exemplary embodiment can be engaged. Therefore, sink rim engaging means 120 comprises an L-shaped hook member 121 (L-shaped, that is, when seen in cross-section as shown in FIG. 7) having as its short arm the laterally and outwardly extending stabilizer 122 attached to rim 118 at a first position P' on rim 118. Stabilizer 122 is substantially parallel to the upper surface of rim and has a length which is approximately one-quarter to two-thirds and preferably one-third to one-half of the overall length L' of bowl portion 112. Stabilizer 122 has a width of from one inch to five inches and preferably in the range of from one and one half inches to about three inches.

At the outer edge of stabilizer 122, a distance of about one and a half inches to three inches from the inner edge of rim 118 at position P' the long arm 124 of hook member 121 extends downwardly a distance which is in the range of from one-third to two-thirds the overall height H' of colander 110. Hook member 121 has an angle A' between long arm 124 and stabilizer 122 of from sixty degrees to one hundred ten degrees. On the outer surface of colander 118 just below position P' there is formed a pair of L-channel slots 117 which are positioned to receive an insert 119 which when inserted extends vertically downwards and, if desired, somewhat outwards at a slight angle of from one degree to as much as sixty degrees from vertical.

When colander 110 is installed onto the rim of a sink, insert 119 contacts the surface of the sink wall. Stabilizer 122 rests on the upper surface of the sink's wall and surrounding countertop (or on the divider in the case of a double basin sink) making contact with the rim of the sink. Stabilizer 122 provides side stabilization preventing colander 110 from rocking side to side, while insert 119 in combination with long arm 124 provides stabilization preventing front to back movement of colander 110, as well as preventing the front of colander 110 from tilting downwards under the weight of the mixture (e.g. wet noodles) placed therein for straining.

Figure 8:
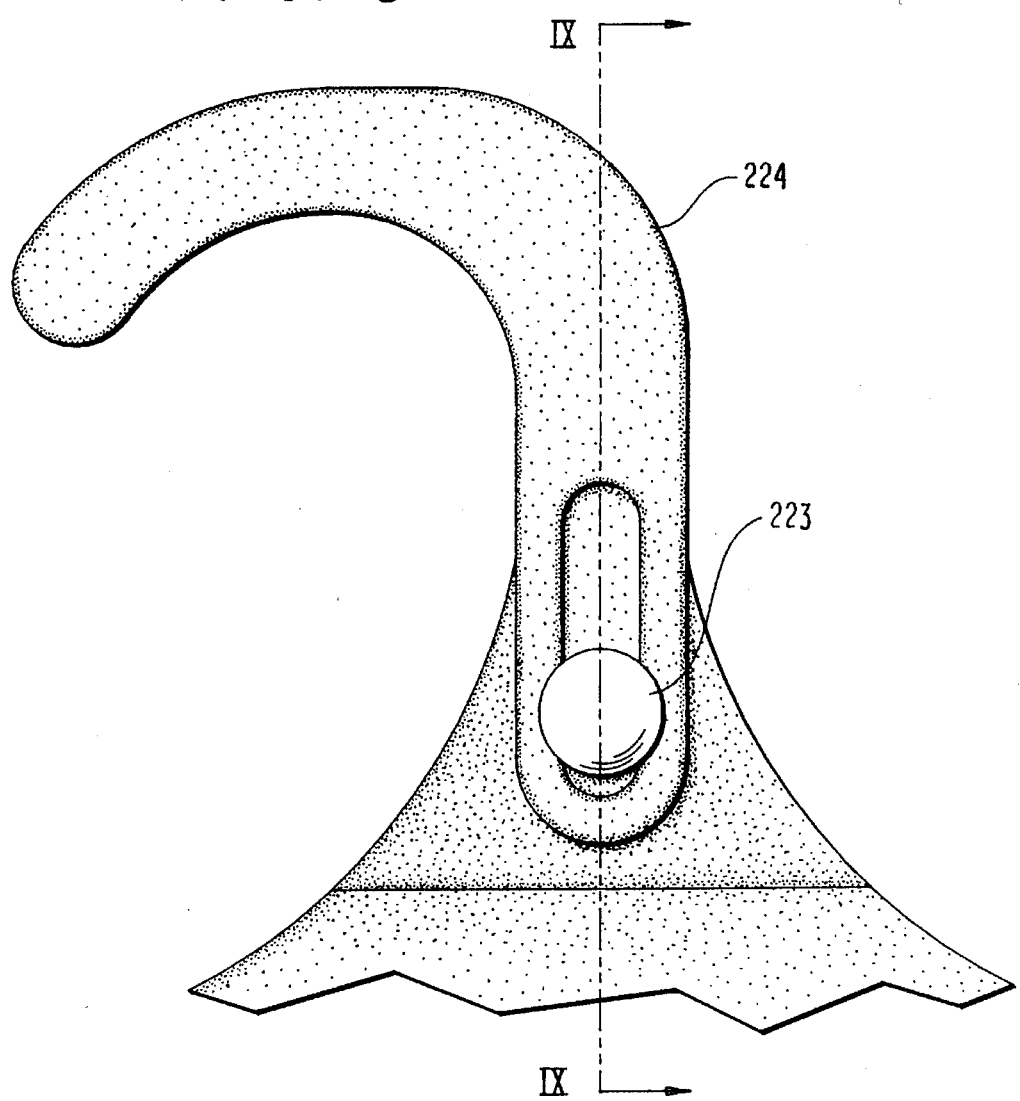
FIG. 8 shows a detailed view of one portion of an exemplary embodiment of an adjustable hook member for an apparatus for straining constructed in accordance with the principles of the present invention.
Figure 9:
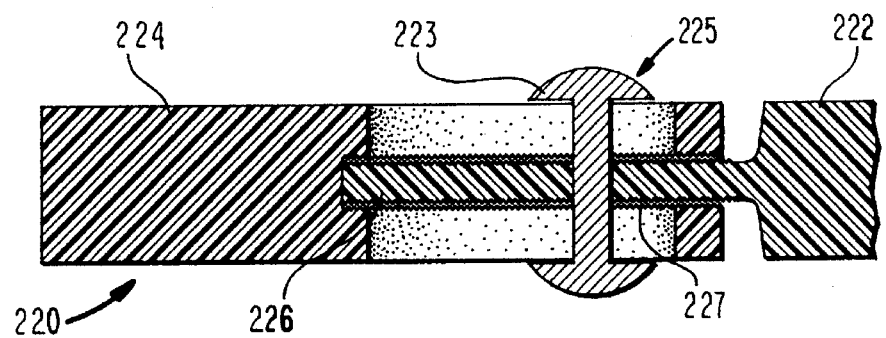
FIG. 9 shows a partial cross-section of the adjustable hook member shown in FIG. 8 and taken along line IX—IX thereof.

With reference now to FIGS. 8–9, nozzle engaging means 220 comprises stabilizer 222 extending from rim 218. Hook member 224 is attached to the distal end of stabilizer 222 by a lockable sliding hinge 225. Thus, a user can adjust the distance between contact surface 226 of hook member 224 and rim 218 to suit her particular sink's requirements. The mechanism shown for hinge 225 comprises having complementary ridges 227 on an upper (or lower) surface of the distal end of stabilizer 222 as well as on the opposing lower surface (or upper) to inhibit movement under pressure of hook member 224 relative to stabilizer 222. Once adjusted to the correct length, locking means 223 is engaged to prevent the need for later readjustment. It should of course be understood that this is only one of many methods by which the hook member can be made having a lockable, adjustable length, there being many other structures which would be easily identified by one skilled in the art of developing housewares and locks.

It will be understood that the embodiments described herein are merely exemplary and that a person skilled in the art may make many variations and modifications without departing from the spirit and scope of the invention. For example, there are many materials from which the invention may be contructed including plastics, wood, metals, etc. Additionally, the shape of the bowl portion may be modified without significant effect on the use of the claimed invention. All such modifications and variations are intended to be included within the scope of the invention as defined in the appended claims.

I claim:

1. A colander for rinsing and straining, comprising a bowl portion having a wall portion and an upper rim thereby defining an inner surface and an outer surface, said bowl portion including a plurality of perforations extending between said inner and outer surfaces and engaging means extending laterally in a plane substantially parallel with said upper rim, said first end of said engaging means attached to said outer surface and said second end of said engaging means forming an angle with said first end, such that a space is created between said second end and said outer surface of said bowl portion, said second end having a contact surface facing said bowl portion for grippingly engaging the back surface of a sink faucet and maintaining said colander thereon.

2. A colander in accordance with claim 1, including means for adjusting said space between said contact surface and said outer surface of said bowl portion.

3. A colander in accordance with claim 1, wherein said contact surface describes an arc.

4. A colander in accordance with claim 1, wherein said first end of said engaging means is coextensive with said upper rim of said bowl portion.

5. A colander in accordance with claim 3, wherein said arc is at least about 60°.

6. A colander for rinsing and straining, comprising a bowl portion having a wall portion and an upper rim thereby defining an inner surface and an outer surface, said bowl portion including a plurality of perforations extending between said inner surface and said outer surface, and engaging means comprising a hook member, said engaging means having a first end and a second end, said first end extending laterally in a plane substantially parallel with said upper rim and said second end forming an angle with said first end and extending substantially downwardly therefrom, and a stabilizer extending downwardly substantially perpendicular to said plane of said upper rim, said first end being attached to said outer surface of said colander, said stabilizer being attached to said colander at a position adjacent to said first end of said engaging means and spaced from the bowl portion whereby a sink rim can be engaged between said stabilizer and said second end of said engaging means and said colander can be stabilized thereby.

7. A colander in accordance with claim 6, wherein said stabilizer is integrally formed with said first end of said engaging means.

8. A colander in accordance with claim 6, wherein said stabilizer is integrally formed with said wall portion of said bowl portion at a position adjacent to said first end of said engaging means.

9. A colander in accordance with claim 6, wherein said stabilizer comprises a stabilizer insert and said wall portion of said bowl portion is provided with receiving means for receiving said stabilizer insert.

10. A colander in accordance with claim 6, wherein said stabilizer comprises a stabilizer insert and said first end of said engaging means is provided with receiving means for receiving said stabilizer insert.

* * * * *